(12) United States Patent
Prewer

(10) Patent No.: US 9,327,262 B2
(45) Date of Patent: May 3, 2016

(54) SOLID PHASE REACTION METHOD AND APPARATUS

(75) Inventor: Andrew Richard Russell Prewer, Rockland-St-Mary (GB)

(73) Assignee: Swedish Biomimetics 3000 Limited, Epsom, Surrey (GB)

( * ) Notice: Subject to any disclaimer, the term of this patent is extended or adjusted under 35 U.S.C. 154(b) by 1116 days.

(21) Appl. No.: 12/667,519

(22) PCT Filed: Jul. 3, 2008

(86) PCT No.: PCT/GB2008/002288
§ 371 (c)(1),
(2), (4) Date: Jan. 26, 2010

(87) PCT Pub. No.: WO2009/004344
PCT Pub. Date: Jan. 8, 2009

(65) Prior Publication Data
US 2010/0190974 A1    Jul. 29, 2010

(30) Foreign Application Priority Data

Jul. 3, 2007    (GB) .................................. 0712922.4

(51) Int. Cl.
| | |
|---|---|
| *C07K 1/04* | (2006.01) |
| *B01J 19/00* | (2006.01) |
| *B82Y 30/00* | (2011.01) |
| *C40B 60/14* | (2006.01) |

(52) U.S. Cl.
CPC ............. *B01J 19/0046* (2013.01); *B82Y 30/00* (2013.01); *C40B 60/14* (2013.01); *B01J 2219/0059* (2013.01); *B01J 2219/00454* (2013.01); *B01J 2219/00497* (2013.01); *B01J 2219/00515* (2013.01); *B01J 2219/00518* (2013.01); *B01J 2219/00527* (2013.01); *B01J 2219/00596* (2013.01); *B01J 2219/00605* (2013.01); *B01J 2219/00655* (2013.01); *B01J 2219/00675* (2013.01); *B01J 2219/00686* (2013.01); *B01J 2219/00725* (2013.01); *B01J 2219/00871* (2013.01)

(58) Field of Classification Search
CPC ......... C07K 1/042; C07K 1/045; C07K 1/047
USPC ............................................... 422/66; 436/44
See application file for complete search history.

(56) References Cited

U.S. PATENT DOCUMENTS

| | | | | |
|---|---|---|---|---|
| 4,272,506 | A | * | 6/1981 | Schwarzberg ................ 436/512 |
| 4,915,812 | A | * | 4/1990 | Parce et al. ................ 204/403.1 |
| 5,420,047 | A | | 5/1995 | Brandt et al. |
| 5,429,925 | A | * | 7/1995 | Vanderlaan et al. ........... 435/7.1 |
| 6,319,722 | B1 | * | 11/2001 | Litwin et al. .................. 436/121 |

(Continued)

FOREIGN PATENT DOCUMENTS

| | | |
|---|---|---|
| CN | 1079786 A | 12/1993 |
| CN | 1578865 A | 2/2005 |

(Continued)

*Primary Examiner* — Jan Ludlow
(74) *Attorney, Agent, or Firm* — Morgan, Lewis & Bockius LLP

(57) ABSTRACT

A solid phase reaction method comprising an elongate material of (1) with a substance provided thereon through at least one reaction zone (2) and comprises at least one group for attachment to at least one linker species of said substance. The elongate material (1) may be a cord ribbon, thread or tape.

11 Claims, 7 Drawing Sheets

(56) References Cited

U.S. PATENT DOCUMENTS

| | | |
|---|---|---|
| 7,273,589 B2 * | 9/2007 | Stimpson et al. ............. 422/509 |
| 7,300,798 B2 * | 11/2007 | Perbost et al. ................. 436/86 |
| 2002/0001544 A1 | 1/2002 | Hess |
| 2003/0119193 A1 | 6/2003 | Hess et al. |
| 2007/0090104 A1 | 4/2007 | Collins et al. |

FOREIGN PATENT DOCUMENTS

| | | |
|---|---|---|
| DE | 10-2004-008319 A1 | 9/2005 |
| DE | 102004008319 A1 | 9/2005 |
| EP | 0 385 433 A2 | 9/1990 |
| EP | 0385433 A | 9/1990 |
| EP | 0 569 940 B1 | 11/1993 |
| EP | 1 304 162 A2 | 4/2003 |
| EP | 1304162 A | 4/2003 |
| GB | 2274843 A | 8/1994 |
| JP | 354051883 A * | 4/1979 |
| JP | 357163866 A * | 10/1982 |
| JP | 2003066021 A | 3/2003 |
| WO | WO 02/13961 A | 2/2002 |
| WO | WO 02/13961 A2 | 2/2002 |
| WO | WO 03/38183 A1 | 5/2003 |
| WO | WO 2009/004344 A1 | 1/2009 |

* cited by examiner

SOLID PHASE REACTION METHOD AND APPARATUS

CROSS REFERENCE TO RELATED APPLICATIONS

This application is a U.S. National Phase of PCT Application No. PCT/GB2008/002288 filed Jul. 3, 2008, which claims priority to GB 0712922.4 filed Jul. 3, 2007, which applications are incorporated herein by reference in their entirety for all purposes.

FIELD OF THE INVENTION

The present invention relates to a solid phase reaction method and apparatus suitable for performing the method.

BACKGROUND OF THE INVENTION

Since its invention, solid phase synthetic methods have been extensively used in the preparation of a wide variety of compounds.

The concept of solid phase synthesis is simply the attachment of a starting species to an insoluble material via a linker group that will cleave under the correct conditions. Reactions are performed on the species, which is rinsed and then subjected to further reaction and rinsing steps. Finally the product is cleaved from the insoluble material and collected.

Typically, resin beads are used as the inert, insoluble material upon which the reactions occur. For example, in peptide synthesis, an amino-protected amino acid is bound to a resin bead, forming a covalent bond between the carbonyl group and the resin. Then the amino group is deprotected and reacted with the carbonyl group of the next amino-protected amino acid. The bead now bears two amino acids. This cycle is repeated to form the desired peptide chain. After all reactions are complete, the synthesized peptide is cleaved from the bead.

Originally the method was used exclusively for the synthesis of peptides, more recently the versatility of this methodology has been used to prepare large libraries of compounds, which in turn has produced a huge number of potential drug candidates.

Manufacture of some complex pharmaceuticals is now carried out using solid phase methods. The complexity of these processes determine the manufacturing cost and hence the product availability to patients.

The key advantages of the solid phase method are the simple work up; frequently a solvent wash is all that is needed, and the ability to push reactions to completion by using large excesses of reagents.

Solid phase reactions are currently performed as batch processes, using several washes of resin beads as mentioned above. There exist inherent limitations in batch processing and a continuous process has a number of advantages over a batch process. A continuous process can be more efficient, more predictable, safer, simpler to operate and more easily automated than a batch process and which reduces both the environmental and manufacturing costs. In addition, a continuous process allows bench scale procedures to be scaled up via parallelisation which is the replication of many identical reactors or processes to give an equivalent yield of products to a large process. Furthermore, a continuous process provides ease of optimisation as ideal conditions can be found by sweeping a variable over a predetermined range and automatically applying for a range of parameters as opposed to carrying out numerous batch reactions with fixed conditions. A viable method of continuous solid phase synthesis has not yet been proposed.

The present invention seeks to address this issue.

According to a first aspect of the present invention there is provided a solid phase reaction method comprising passing an elongate material with a substance provided thereon through at least one reaction zone and reacting said substance in said zone.

Using an elongate material enables a continuous process to be performed.

The elongate material may be passed through the at least one reaction zone continuously or intermittently.

Preferably said substance is reacted with a substance in solution, said solution being provided in said zone. Alternatively or additionally, said substance may be reacted with a liquid or gas provided in said zone.

Preferably said substance is provided on said material in one of said reaction zones.

Preferably said material is substantially insoluble in the contents of said at least one reaction zone. Preferably said material is a polymer. Said polymer may be natural or synthetic. Preferably said material comprises groups that allow for attachment to at least one linker species of said substance. Said at least one linker species may comprise free hydroxyl, amino, or amide groups, or any other suitable group. In one embodiment said material is cellulose. In said embodiment cotton may be used. The cellulose or cotton may be suitably pre-treated. For example the cotton may be soaked in a solution of coupling agent (diisopropylcarbodiimide), and a spacer (aminohexanoic acid). The spacer is a flexible molecule that improves access of the linker to the solvated species. The cord is washed, deprotected and next a linker (Rink) is coupled to the spacer using the coupling agent HATU.

Preferably the elongate material is in a form that maximises its surface area to volume ratio. For example the elongate material may be ribbon, cord, thread, tape or of any other suitable form. Maximising surface area to volume ratio maximises the extent of the reaction of between the reactants and the substance and maximises the use of reagents.

Using such an elongate material is much simpler and more convenient than with other forms of solid phase, for example beaded resins require the use of expensive fritted glass vessels.

The elongate material may be easily exposed to short path length energy sources, such as ultrasound, microwaves and other electromagnetic waves by virtue of its small cross section. With batch processes, due to their large size, it is much more difficult to expose all of the batch to such energy sources. These energy sources may accelerate chemical reactions and enhance yields and product purity when compared with an equivalent thermal energisation.

Preferably said at least one reaction zone is configured to optimise the exposure of reagents to said energy sources. The use of microwaves and/or ultrasound has been shown to improve the efficiency of some chemical reactions. These techniques are important in reducing the environmental cost of chemical processes through reducing the consumption of materials and energy.

Preferably said elongate material is passed through a plurality of said reaction zones. Said substance may be reacted in each reaction zone.

Preferably said elongate material is passed through at least one rinsing zone, wherein the elongate material and/or said substance is subject to rinsing by a rinsing agent.

The elongate material may be passed through the at least one rinsing zone continuously or intermittently.

Preferably said elongate material is passed through a plurality of rinsing zones.

The at least one reaction and/or rinsing zone may host at least one reagent in any phase suitable for the desired reactions. Preferably the reaction and rinsing zones host a plurality of said reagents. Preferably the at least one reaction zone is configured to ensure optimal reagent use through the control of the flow of the elongate material and of said at least one reagent.

The above method allows the reaction or reactions of said substance on the elongate material in said reaction zone or zones, as well as the rinsing of the material and/or said substance to be carried out continuously, as the elongate material passes from zone to zone.

The elongate material may be a tape form of insoluble solid phase matrix.

Preferably said elongate material is passed through reaction and rinsing zones alternately.

Preferably said at least one reaction zone is equipped with testing apparatus for the collection of data from said elongate material.

Preferably movement of the elongate material through the at least one reaction zone or, where applicable, through the reaction zones and/or the rinsing zones is effected by a drive means. The drive means may comprise at least one rotatable unit such as a roller, spool or any other suitable device. In one embodiment, the elongate material is magnetic and the drive means comprises at least one induction coil used to create a magnetic field such that said movement of the elongate material is effected.

Where the drive means comprises a plurality of rotatable units, a control means is preferably operatively connected to the drive means such that the rotatable units rotate in sychronisation with each other. This ensures that a constant tension is maintained in the elongate material. This may be achieved by connecting the rotatable units with a drive belt, preferably a toothed drive belt.

Similarly, where the drive means comprises a plurality of induction coils, a control means is preferably operatively connected to the induction coils to control a magnetic field created by the induction coils such that a constant tension is maintained in the elongate material.

Preferably said zones are connectable with each other and with said drive means. This connectability is preferably modular. In this way, a long chain of reaction and/or rinsing zones may be connected to each other and to one or a plurality of drive means in order to provide a long chain of reaction and rinsing stages. Such connectability allows combinations and sequences of said zones to be varied easily allowing a wide range of reactions to be produced using this method. Said zones may be manufactured and sold as "off the shelf units", allowing a process plant suitable for using such a method, to be assembled and disassembled quickly.

In one arrangement a number of substantially identical modules arranged to be connected together are provided.

A reaction product may remain attached to the elongate material as the elongate material is removed from said at least one reaction zone. The product may then be cleaved from said elongate material. Before the product is cleaved, a spectrometer may analyse the product.

Alternatively, the product may separate from the elongate material in the reaction zone.

Reactants and/or reagents which may be different reactors or reagents may be deposited onto defined areas of the elongate material. This allows for a large number of different compounds to be prepared on the elongate material and also allows each of these compounds to be subject to testing, for example biological or spectrographic testing.

The reacting of said substance may comprise the step of reacting the substance with a solution to form a product which is insoluble in the solution and may then be removed from the solution. This may comprise the step of forming a metal complex between the substance and a substance present in the solution. Alternatively or additionally this may comprise the step of forming a biological compound between the substance and a substance present in the solution. The substance present in the solution may be in any form, for example in suspension or solution.

In one embodiment of the invention, the substance is a reagent.

The method may comprise the step of testing said substance or the product of one or more reactions with said substance for biological activity.

The elongate material may be passed through a plurality of reaction zones sequentially wherein at least two of said zones contain differing reactions.

The elongate member may be endless. In this case, the elongate member may be in the form of a loop. Where the elongate member is endless, the elongate member may be continuously or intermittently passed through said at least one reaction zone and/or said at least one rinsing zone.

The method may be used independently or in conjunction with a traditional batch reactor.

According to a second aspect of the present invention there is provided apparatus for performing the method of the first aspect of the invention, said apparatus comprising an elongate material with a substance provided thereon and a reaction zone, arranged such that the elongate material is moveable through the reaction zone such that the substance may be reacted in the reaction zone.

Preferably the apparatus comprises a fluid source connected to an inlet to the reaction zone such that fluid may be supplied to the reaction zone from the fluid source and wherein the fluid comprises at least one reactant for reaction with said substance. Preferably the fluid is a liquid. More preferably the liquid is a solution. Preferably fluid supplied to the reaction zone flows through the zone and out of an outlet from the reaction zone.

Preferably the reaction zone is a conduit.

Preferably a drive means effects the movement of the elongate member through the reaction zone. The drive means may be a stepper motor, induction coil or any other suitable device.

Preferably the drive means is operatively connected to a control means. Where the drive means is a motor, the control means preferably comprises a computer connected to a motor controller.

The computer unit is preferably operatively connected to the stepper motor via the motor controller. The speed of rotation of the motor can preferably be set by appropriate inputs to the computer unit. The motor is preferably arranged to drive the elongate member through the reaction zone. A flexi drive is preferably used to couple the motor to the elongate member.

Preferably the conduit is provided in at least one block. Preferably the apparatus comprises at least three blocks and the conduit is formed within the blocks. Each of the blocks may be generally cuboidal, each having a front face, rear face, top face, bottom face and opposed side faces. The blocks are preferably formed from glass, poly(tetrafluoroethane) (PTFE), or any other suitable material. The blocks may occupy an upright orientation and be connected to each other such that the blocks occupy front, central and rear positions. In this case, the rear face of the front block preferably is in contact with the front face of the central block and the rear face of the central block preferably is in contact with the front face of the rear block.

The blocks are preferably connected to each other by a fastening means. For example, a row of apertures may be provided along opposed side edges of each block extending in a direction substantially parallel to the side edges and indented inwardly of the side edges. Respective said apertures in the blocks are preferably aligned with each other, bolts are preferably passed through said apertures and nuts are preferably engaged with respective bolts so as to fix the blocks together.

Preferably a channel is provided along the rear face of the front block. In this case, the channel preferably has a U-section and extends from the top of the block, in a direction substantially parallel to the side edges of the block. The channel preferably terminates at a height above a bottom of the block. A front face of the central block is preferably in contact with the rear face of the front block such that it closes the channel, to form a conduit.

Preferably an inlet aperture is provided in the front face of the front block towards the top of the block. An inlet bore preferably extends from the inlet aperture, in a direction substantially perpendicular to the channel, and terminates at a point of intersection with the channel.

The central block is preferably provided with an aperture towards a bottom of and extending through the block. A roller is preferably rotatably mounted within the aperture.

In a similar arrangement as with the front block, a channel is preferably provided along the front face of the rear block. The channel preferably has a U-section and extends from the top of the block, in a direction substantially parallel to the side edges of the block. The channel preferably terminates at a height above the bottom of the block. A rear face of the central block is preferably in contact with the front face of the rear block such that it closes the channel, to form a conduit.

Such channels are preferably suitable to receive the elongate member.

An outlet aperture is preferably provided in the rear face of the rear block towards the top of the block. An outlet bore preferably extends from the outlet aperture, in a direction substantially perpendicular to the channel, and terminates at a point of intersection with the channel.

The aperture in the central block preferably intersects the channels in the front and rear blocks such that, in effect, a continuous conduit is created from the inlet aperture in the front block to the outlet aperture in the rear block. This continuous conduit preferably forms the reaction zone.

The elongate member is preferably fed into the top of the front block through the channel in the block. The elongate member preferably passes downwardly through the channel in the front block, is looped underneath the roller in the central block, passes upwardly through the channel in the rear block and out of the top of the rear block.

The fluid source is preferably connected to the inlet aperture in the front block via a fluid feed line. Fluid in the fluid source is preferably forced under pressure through the fluid feed line, into the inlet aperture, through the inlet bore, downwardly through the channel in the first block, from where it flows out through the cavity in the central block, upwardly through the channel in the rear block, through the outlet bore, through the outlet in the rear block and back into a return section of the fluid feed line.

A substance to be reacted is preferably provided on the elongate member. Alternatively the substance may be linked to the elongate member in the reaction zone. The elongate member preferably comprises a polymeric material suitable to host a solid phase reaction. For example the polymeric material is preferably substantially insoluble in the fluid present in the reaction zone and comprises groups that allow for attachment to at least one linker species of the substance. In the present embodiment the material is cellulose, or cotton. Any group that may act as a linker group may be appropriate.

The three blocks of the reactor may be disassembled. This provides a means of cleaning the apparatus and also an easy means of passing the solid phase ribbon through the channels in the blocks.

The inlet and outlet for the elongate member are preferably disposed above the inlet and outlet for the fluid. In this way, the elongate member may be easily separated from the fluid.

Since there are separate inlet and outlet points for the solid phase ribbon and the fluid, this allows for the solid phase ribbon and fluid to flow in the same direction or in reverse directions. Flowing in the reverse direction allows a concentration gradient to be established.

One way of increasing the time of the reaction and/or the amount of product produced by the reaction, under given conditions, is to increase the size of the reaction zone, for example by increasing the height of the channels and the length of the solid phase ribbon. However, due to obvious physical constraints, the height of the channels is limited and therefore the time of the reaction and/or the amount of product that may be produced under given conditions is limited.

The present embodiment of the invention seeks to overcome this issue. A number of said blocks may be connected together side by side to form a number of reaction zones. In such a configuration, the solid phase ribbon may be passed from the outlet of one block into the inlet of an adjacent block.

A single source of fluid may supply all of the reaction zones, with fluid feed lines connecting each of the blocks together.

The assembly of blocks may be such so as to replicate the synthetic pathway.

In order that the present invention maybe more fully understood embodiments thereof will now be described with reference to the attached drawings, of which:

Figure 1:
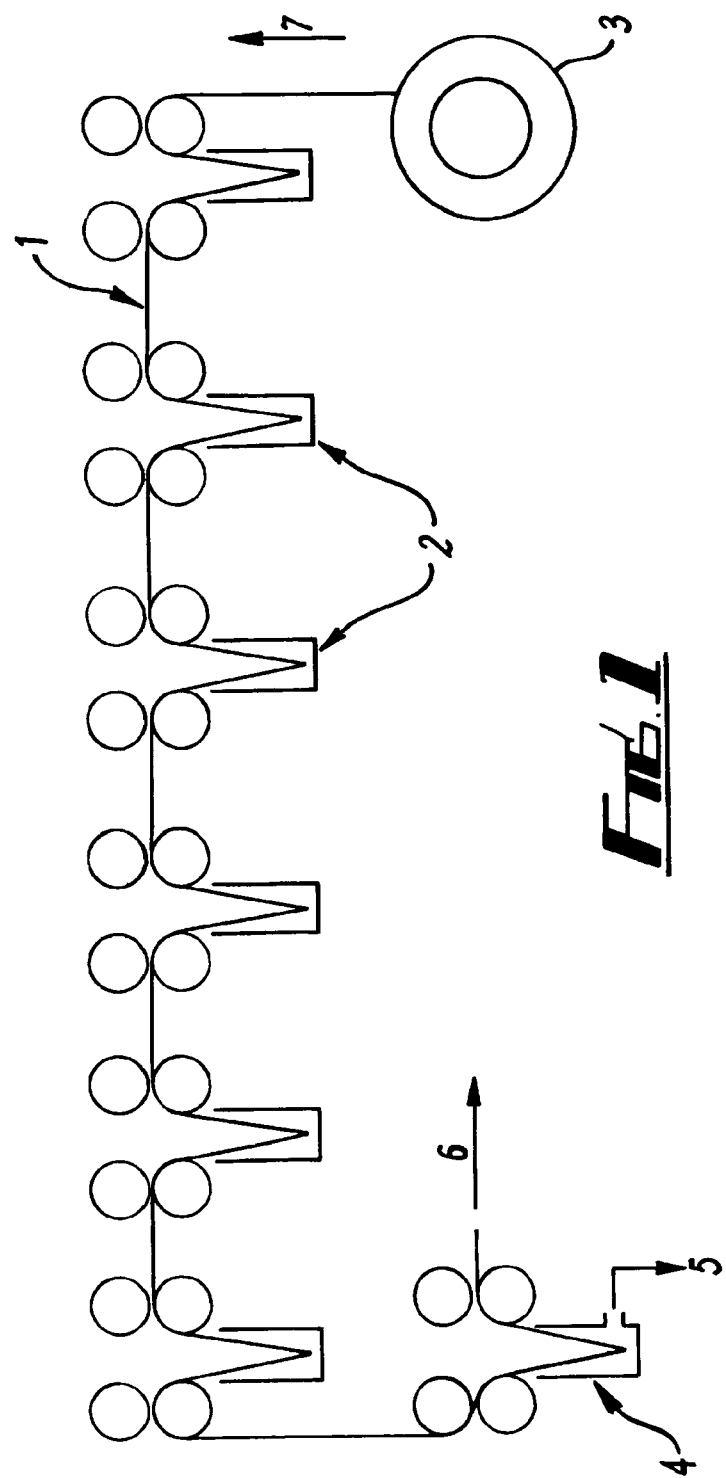
FIG. 1 is a schematic diagram of a multistep continuous synthesis reaction according to the present invention.

Referring to the drawings, a solid phase synthesis reaction according to the present invention comprises a cord 1, being passed through a series of zones 2. Cord 1 is fed from cord spool 3 in direction of arrow 7.

SUMMARY OF THE INVENTION

Cord 1 is a polymeric material suitable to host a solid phase reaction. In the present embodiment the material is cellulose, or cotton. However, a cord that comprises chemical groups that allow reaction with a suitable chemical species for the reaction to be undertaken may of course be used. Any group that may act as a linker group may be appropriate. The link may later be cleaved in any suitable manner, such as chemically, enzymatically or using radiation. Groups such as free hydroxyl, amino, or amide groups may be appropriate linker groups, although there are many hundreds of known alternatives which would also be suitable.

It is evident that cord 1 may be of varying diameters. Cord 1 may be substituted with any other suitable elongate form, such as a tape, ribbon or thread.

It is desirable to maximise surface area to volume ratio of the polymeric material. Maximising surface area to volume ratio maximises the extent of the reaction of between the reactants and the chemical species and maximises the use of reagents.

The cord 1 passes through a series of zones 2, which may involve reaction or rinsing. In the present embodiment the zones host reaction and rinsing phases alternately. Evidently the zones 2 may host appropriate phases for whatever reaction is to be performed; any combination of reaction or rinsing stages might be appropriate. The zones 2 may of course host reagents in any phase suitable for the desired reactions.

In passing the cord 1 through the reaction zones the cord 1 is fed through said zones 2, either continuously or intermittently. For the most part, when the methodology of the present invention is being used, at any one instant different parts of the cord 1 are passing through different reaction zones 2; this is in contrast to the traditional batch process method of reaction.

In the present embodiment a chemical species is linked to the cord 1 in one of the zones 2 that the cord 1 passes through, but evidently said species may be provided on said cord 1 before the reaction scheme of FIG. 1 is commenced.

The species then undergoes a reaction in the next reaction zone. The product of this reaction subsequently undergoes a further reaction in another reaction zone, and so on, until in zone 4 a product is cleaved from the cord and removed to storage 5. The cord 1 is removed with arrow 6, to be reused or to waste.

Figure 2:
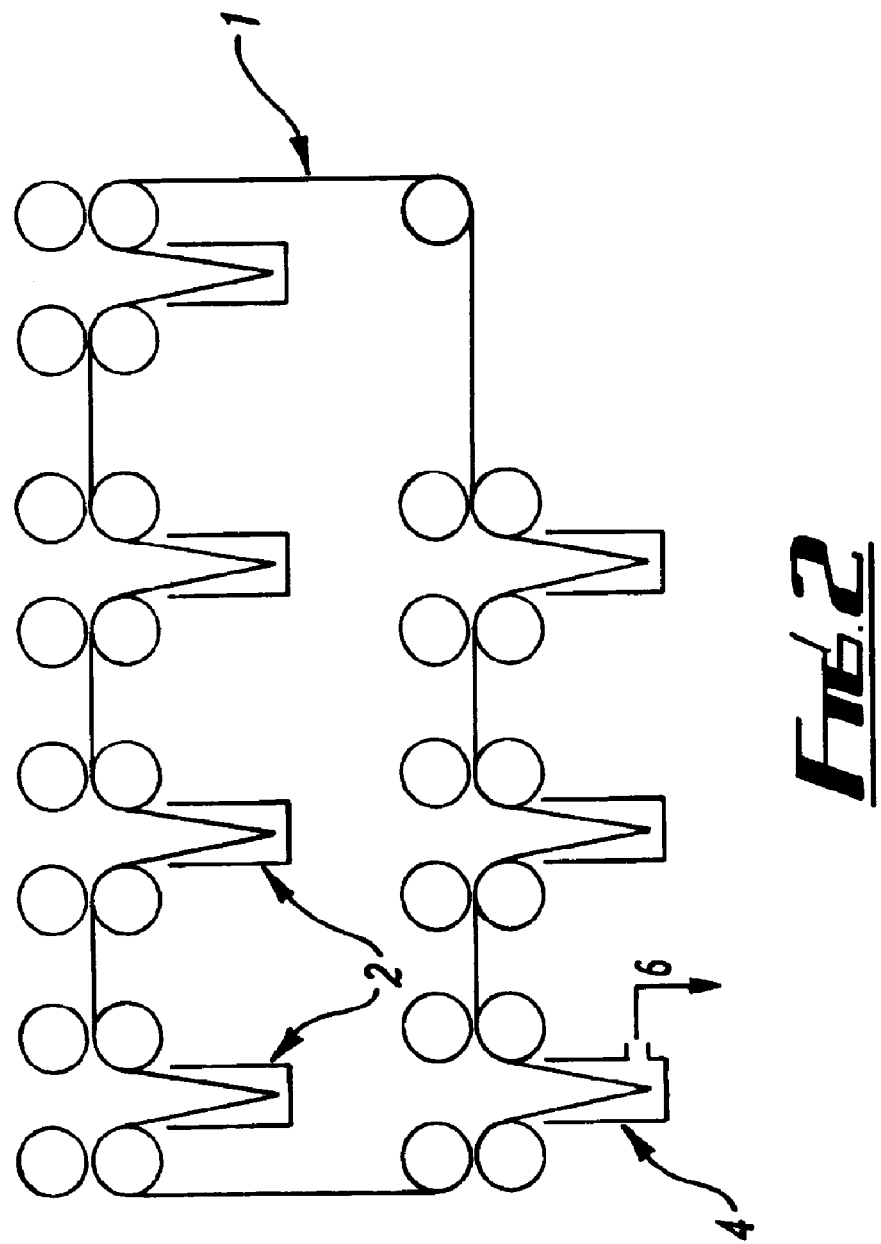
FIG. 2 is a schematic diagram of a multistep recycling synthesis reaction according to the present invention.

FIG. 2 shows a reaction scheme in accordance with the present invention arranged such that the cord 1 is continuously recycled.

Figure 3:
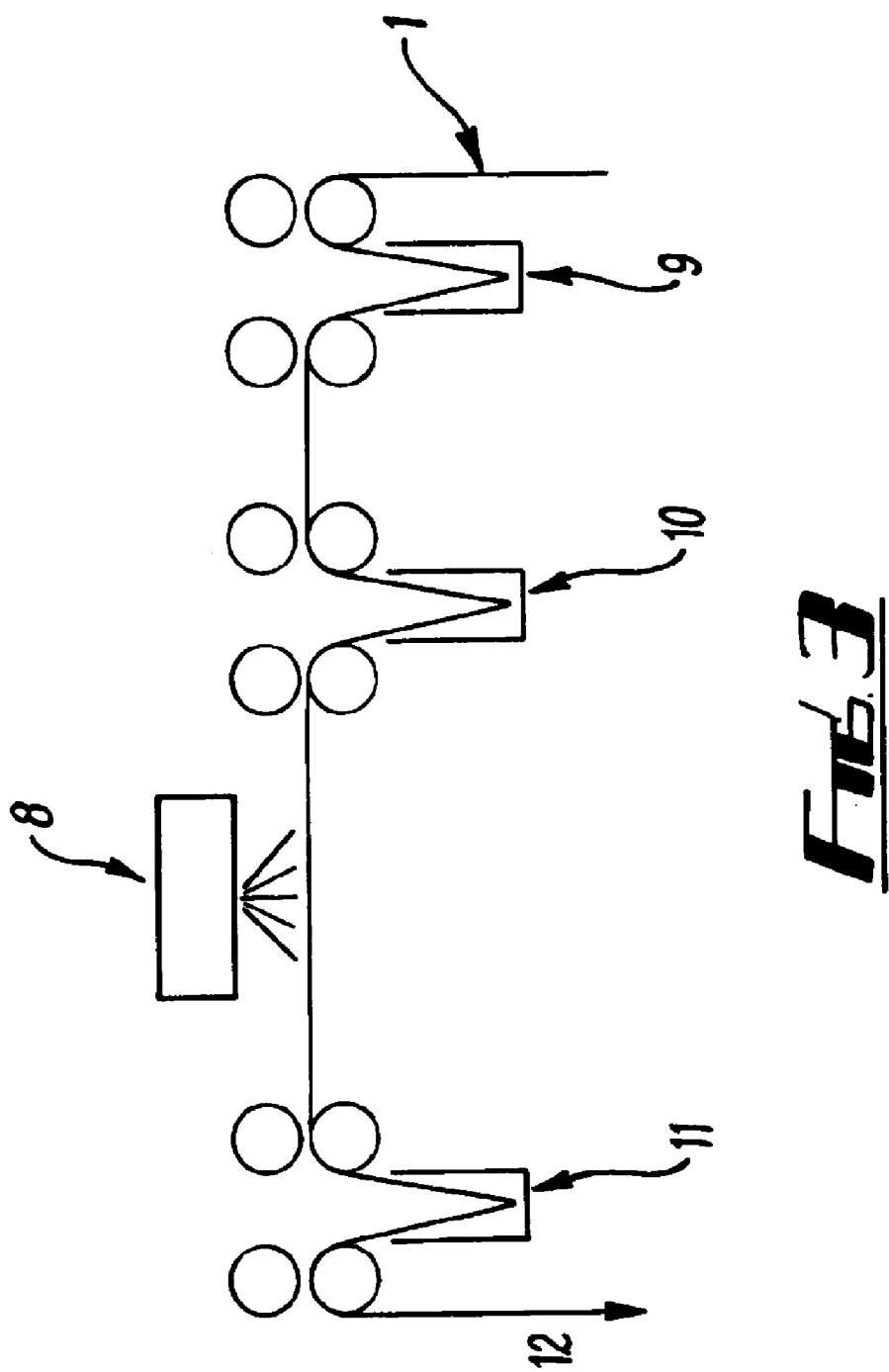
FIG. 3 is a schematic diagram of a multistep microwave assisted reaction according to the present invention.

FIG. 3 is a schematic diagram of a microwave assisted reaction. Zones 9 and 10 contain differing reagents, and cord 1 is passed sequentially through these. Cord 1 is then subjected to microwaves from microwave source 11 so as to assist a reaction between said reagents and a species provided on the surface of said cord. Cord 1 continues with arrow 12 for the species provided thereon to undergo further reactions or for cleavage of a product.

Figure 4:
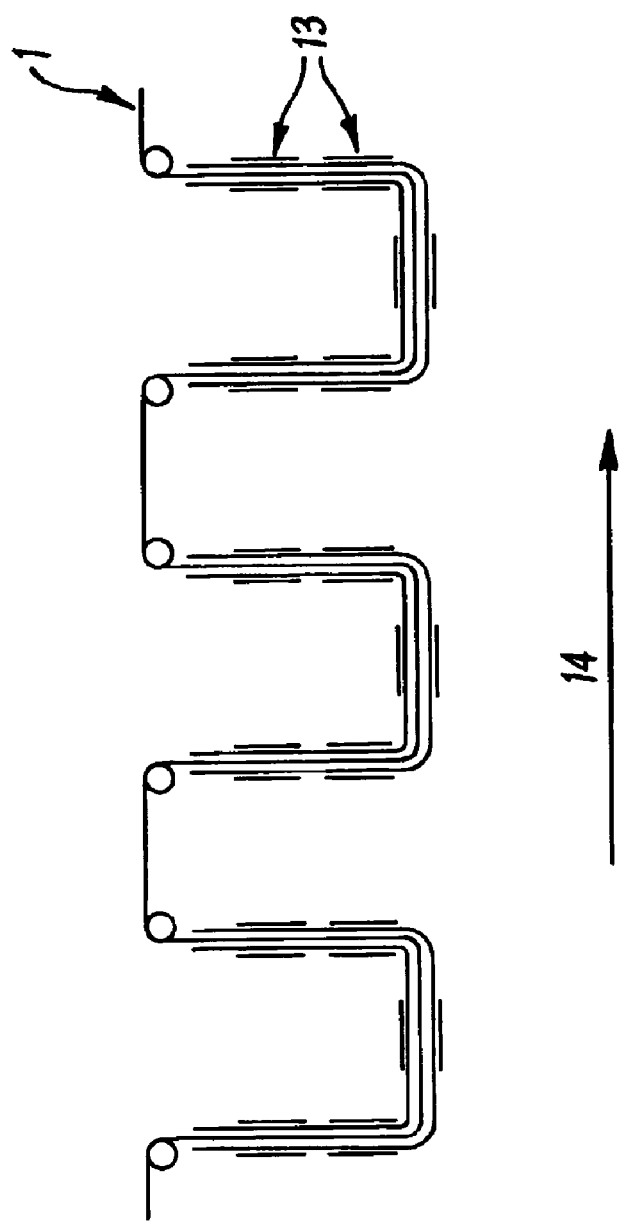
FIG. 4 is a schematic diagram of a magnetic cord being propelled through the reaction zones by magnetic fields.
Figure 5:
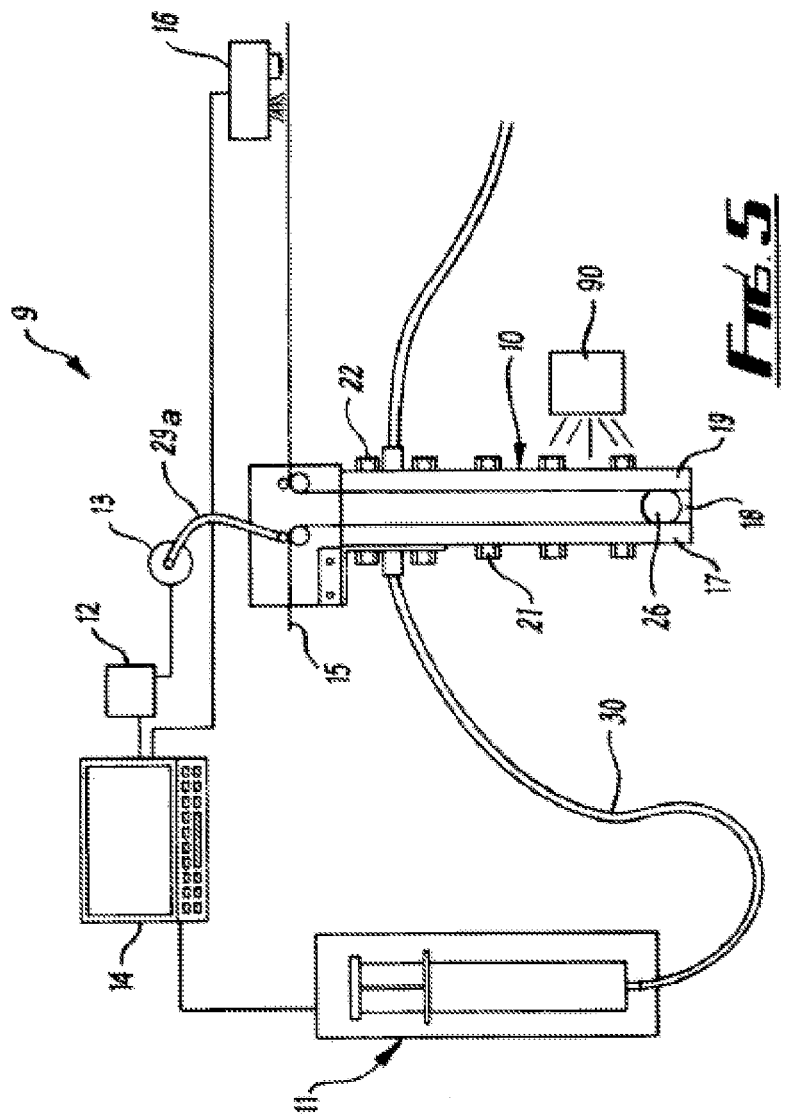
FIG. 5 is a schematic diagram of apparatus according to a further aspect of the present invention.
Figure 6:
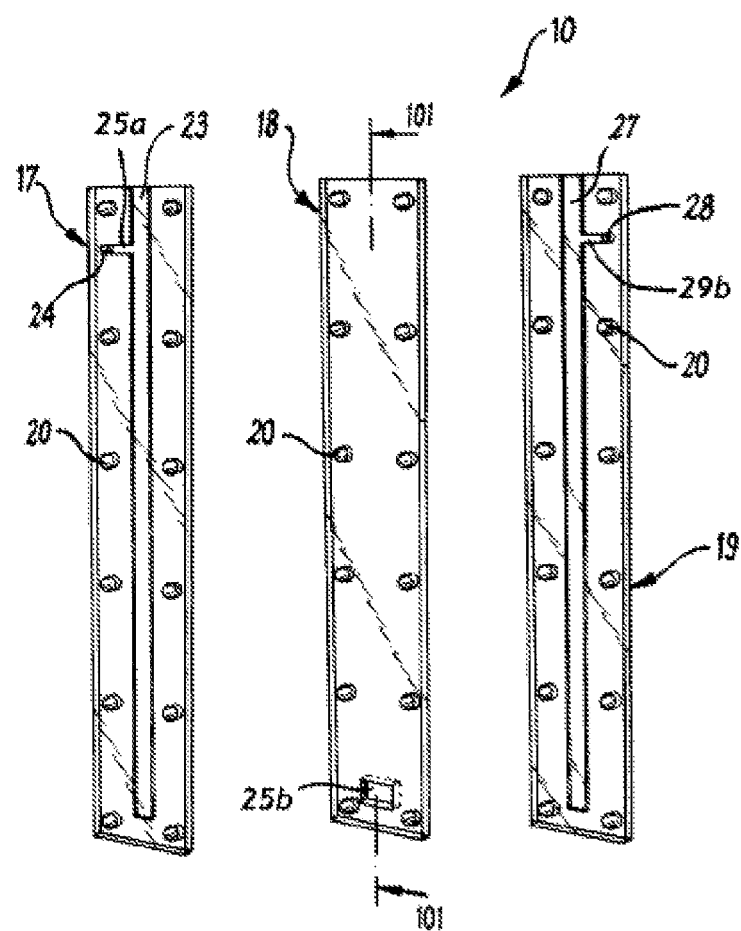
FIG. 6 is an enlarged exploded view of the reactor shown in FIG. 5.
Figure 11:
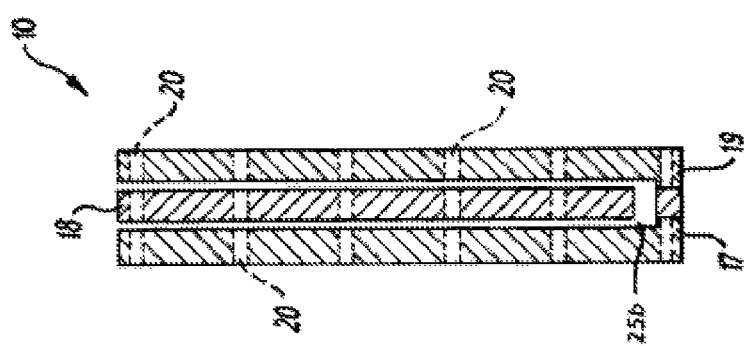
FIG. 11 is a cross-sectional view of the glass reactor taken along the line 101 of FIG. 6 but of the reactor in assembled form.
Figure 10:
FIG. 10 is a cross-sectional view of the rear glass block taken along the line 100 of FIG. 9.
Figure 9:
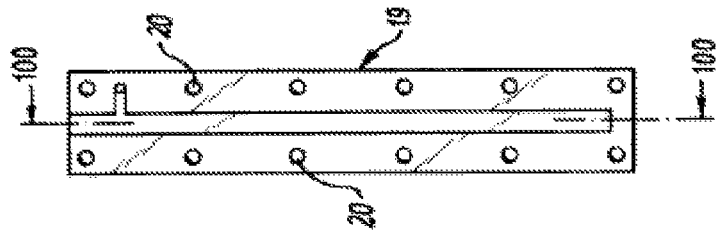
FIG. 9 is a front elevational view of the rear glass block of the reactor shown in FIGS. 5 and 6.
Figure 8:
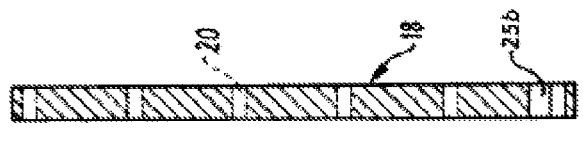
FIG. 8 is a cross-sectional view of the central glass block taken along the line 99 of FIG. 7.
Figure 7:
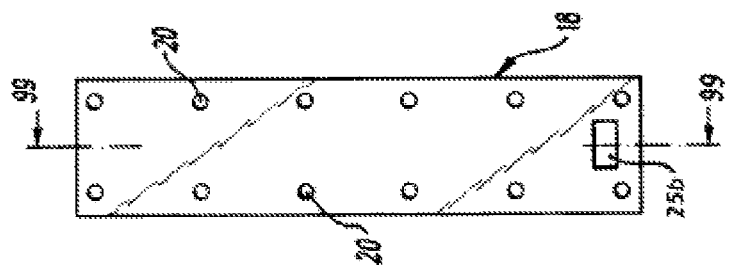
FIG. 7 is a front elevational view of the central glass block of the reactor shown in FIGS. 5 and 6.

FIG. 4 is a schematic diagram showing how movement of cord 1 in direction of arrow 14 is effected through magnetic fields generated by induction coils 13. In this instance cord 1 is itself magnetic. Cord 1 may be made magnetic through imbuing cord 1 with magnetic particles.

The method of the present invention has numerous applications, and may be used for various solid phase reactions, including solid phase synthesis as described above, wherein a product is removed from the cord.

Also possible is metal scavenging wherein species provided on the cord form a complex with metal in aqueous solution and thereby remove said metal from said solution. This application is, however, not limited to metal scavenging, as other species may be scavenged, for example biological compounds.

Further, there is the possibility of preparing chemical species on the cord and then testing said species for biological activity without cleaving said species from the cord.

The scheme of the present invention has several advantages over the prior art. Firstly the cord can be handled easily, using rollers and spools; whereas beaded resins, previously used, require expensive fritted glass vessels.

The cord may be easily exposed to energy sources, such as ultrasound, microwaves and other electromagnetic waves. This is by virtue of the small cross-section of the reactor (large batch reactors require large and expensive arrays of sources).

Furthermore, reagents/reactants can be deposited onto defined areas of the cord, these defined areas corresponding to a particular product. This allows for a plurality of and specifically a large number of different compounds to be prepared on the cord and these 'spatially addressed' compounds subjected to testing, for example biological or spectrographic testing.

In an alternative embodiment of the invention the cord can be used as a solid supported reagent. In this application a particular chemical entity is present on the cord and is moved through (a solution of) reactants, such that the spent cord is easily removed from the liquid once the desired reaction has occurred. Essentially this is the mirror image of the method of operation described above, as the desired product(s) remains in at least one of the reaction zones after the cord has been passed through them.

The inventive arrangement herein described allows for continuous multi-step production of complex chemicals; a continuous flow of product may be collected.

The cord may be moved counter-current to the reagent(s) used, such that fresh reagent enters one end and exhausted reagent leaves the other; thus efficiently using said reagent(s) The movement of the cord counter-current to the reagent(s) creates a concentration gradient such that the efficiency of said rinsing process is improved.

In this application, the elongate material is housed within a conduit as it is passed through said zones. The conduit has a cross-sectional area suitable to contain the flow of the (solution of) reactants and the cord. When too narrow a channel is used, the movement of the cord causes unwanted movement of the (solution of) reactants. When too wide a channel is used, too much of the (solution of) reactants is wasted.

A further embodiment of the invention is shown in FIGS. 5 to 11. Apparatus 9 comprises a reactor 10, a syringe and syringe drive 11, a motor controller 12, a stepper motor 13, a computer unit 14, a solid phase ribbon 15 and a spectrometer 16.

The reactor 10 comprises a front block 17, a central block 18 and a rear block 19. Each of the blocks are generally cuboidal and formed from glass. Alternatively the blocks may be formed from poly(tetrafluoroethane) (PTFE), which is cheaper to machine. A row of apertures 20 is provided along opposed side edges of each block 17,18,19 extending in a direction substantially parallel to the side edges and indented inwardly of the side edges. Respective apertures 20 in the blocks 17,18,19 are aligned with each other. Bolts 21 pass through respective aligned apertures and nuts 22 are engaged with respective bolts 21 so as to fix the glass blocks 17,18,19 together.

A channel 23 is provided along a rear face of the front block 17. The channel 23 has a U-section and extends from a top side of the block 17, in a direction substantially parallel to the side edges of the block 17. The channel 23 terminates at a height above a bottom edge of the block 17. A front face of the central block 18 is in contact with a rear face of the front block 17 such that it closes the channel 23 to form a conduit. The channel 23 is of suitable dimensions to receive a solid phase ribbon 15.

An inlet aperture 24 is provided in the front face of the front block 17 towards a top of the block 17 and disposed to one side of the block 17. An inlet bore 25a extends from the inlet aperture 24 in a direction substantially perpendicular to the channel 23 and terminates at a point of intersection with the channel 23.

The central block 18 is provided with an aperture 25b towards a bottom of the block 18, within which a roller 26 is rotatably mounted relative to the block.

In a similar arrangement as with the front block 18, a channel 27 is provided along a front face of the rear block 19. The channel 27 has a U-section and extends from a top side of the block 19 in a direction substantially parallel to the side edges of the block 19. The channel 27 terminates at a height above a bottom edge of the block 19. A rear face of the central block 18 is in contact with the front face of the rear block 19 such that it closes the channel 27 to form a conduit. The channel 27 is of suitable dimensions to receive a solid phase ribbon 15.

An outlet aperture 28 is provided in a rear face of the rear block 19 towards the top of the block 19 and disposed to one side of the block 19. An outlet bore 29b extends from the outlet aperture 28 in a direction substantially perpendicular to the channel 27 and terminates at a point of intersection with the channel 27.

The cavity 25b in the central block 18 intersects the channels 23,27 in the front and rear blocks 17,19 such that, in effect, a continuous conduit is created from the inlet aperture 24 in the front block 17 to the outlet aperture 28 in the rear block 19. This continuous conduit forms a reaction zone.

The solid phase ribbon 15 is fed into the top of the front block 17 through the channel 23 in the block 17. The ribbon 15 passes downwardly through the channel 23 in the front block 17, is looped underneath the roller 26 in the central block 18, passes upwardly through the channel 27 in the rear block 19 and out of the top of the rear block 19.

The computer unit 14 is operatively connected to the stepper motor 13 via the motor controller 12. The speed of rotation of the motor 13 can be set by appropriate inputs to the computer unit 14. The motor 13 is arranged to drive the solid phase ribbon 15 through the reaction zone. A flexi drive 29a is used to couple the motor 13 to the solid phase ribbon 15.

The syringe and syringe driver 11 is controlled by the computer unit 14 and is connected to the inlet aperture 24 in the front block 17 via a fluid feed line 30. Fluid in the syringe 11 is forced under pressure through the fluid feed line 30 into the inlet aperture 24 through the inlet bore 25a, downwardly through the channel 23 in the front block 17, through the aperture 25b in the central block 18, upwardly through the channel 27 in the rear block 19, through the outlet bore 29b through the outlet aperture 28 in the rear block 19 and back into a return section of the fluid feed line 30. In the present embodiment the fluid is a liquid solution, although obviously a gas may be used.

A substance to be reacted is provided on the solid phase ribbon 15. Alternatively the substance may be linked to the solid phase ribbon 15 in the reaction zone. The solid phase ribbon 15 comprises a polymeric material suitable to host a solid phase reaction. For example the polymeric material is substantially insoluble in the solution present in the reaction zone and comprises groups that allow for attachment to at least one linker species of the substance. In the present embodiment the material is cellulose, or cotton. Any group that may act as a linker group may be appropriate.

As the solid phase ribbon 15 passes through the solution in the reaction zone, the substance reacts with the solution to form a product. A microwave energy source 90 exposes the solid phase ribbon 15 in the reaction zone, to microwave radiation. This improves the efficiency of the reaction.

In this case, the use of PTFE blocks instead of glass blocks, provides an advantage in that PTFE is more transparent to microwaves than glass.

The product remains attached to the solid phase ribbon 15 upon exit from the reactor 10 and may be cleaved at a later stage. Before the product is cleaved, the spectrometer 16 analyses the product.

The reactor 10 may be disassembled. Specifically, each of the three blocks of the reactor 10 may be disassembled. This provides a means of cleaning the apparatus 17,18,19 and also an easy means of passing the solid phase ribbon 15 through the channels 23,27 in the blocks 17,18,19.

Since there are separate entry and exit points for the solid phase ribbon 15 and the solution, this allows the solid phase ribbon 15 and solution to flow in the same direction or in reverse directions. Flowing in the reverse direction allows a concentration gradient to be established.

One way of increasing the time of the reaction and/or the amount of product produced by the reaction, under given conditions, is to increase the size of the reaction zone, for example by increasing the height of the channels 23,27 and the length of the solid phase ribbon 15. However, due to obvious physical constraints, the height of the channels 23,27 is limited and therefore the time of the reaction and/or the amount of the product that may be produced under given conditions is limited.

The present embodiment of the inventions seeks to overcome this issue. A number of reactors 10 may be connected together side by side to form a number of reaction zones. In such a configuration, the solid phase ribbon 15 may be passed from the outlet of one reactor into the inlet of an adjacent reactor.

A single source of fluid may supply all of the reaction zones, with fluid feed lines connecting each of the reactors together.

The above embodiments are by way of example only; many variations are possible without departing from the scope of the invention as defined by the appended claims.

What is claimed is:

1. Apparatus suitable for performing a solid phase reaction method comprising passing an insoluble elongate material having a starting species attached thereon via a cleavable linker group through at least one reaction zone and reacting said species in said zone, the apparatus comprising: an insoluble elongate material having a starting species attached thereon via a cleavable linker group and a reaction zone, arranged such that the insoluble elongate material is moveable through the reaction zone such that the species is reacted in the reaction zone, the reaction zone being a conduit comprising a fluid source connected to an inlet to the reaction zone such that fluid may be supplied to the reaction zone from the source, the fluid comprising at least one reactant for reaction with said species, and the fluid supplied to the reaction zone flowing through the zone and out of an outlet from the reaction zone, wherein an inlet and outlet of the elongate material to and from the reaction zone respectively are located above the inlet and outlet of the fluid to and from the reaction zone respectively, and wherein the apparatus comprises a plurality of reaction zones that are connected together, and are supplied by a single source of fluid, and wherein said elongate material passes from the outlet of one reaction zone of said plurality of reaction zones into the inlet of an adjacent reaction zone of said plurality of reaction zones.

2. Apparatus of claim 1, wherein the elongate material is a solid phase ribbon.

3. Apparatus of claim 1, wherein the fluid is a liquid.

4. Apparatus of claim 1, further comprising a drive means for effecting the movement of the elongate material through the reaction zone.

5. An apparatus of claim 1, wherein the elongate material comprises cotton.

6. An apparatus of claim 1, wherein the apparatus further comprises a rinsing zone arranged so that the elongate material is moveable through the rinsing zone and wherein the elongate material is subject to rinsing by a rinsing agent.

7. An apparatus of claim 1, wherein the apparatus further comprises a rinsing zone arranged so that the elongate material is moveable through the rinsing zone and wherein the elongate material is subject to rinsing by a rinsing agent, the rinsing zone being a conduit comprising a second fluid source connected to an inlet to the rinsing zone such that fluid may be supplied to the rinsing zone from the second fluid source, and the fluid supplied to the rinsing zone flowing through the zone and out of an outlet from the rinsing zone.

8. An apparatus of claim 1, wherein the apparatus is adapted to perform a multi-step synthesis comprising a sequence of at least two differing reactions.

9. Apparatus suitable for a solid phase reaction method comprising passing an insoluble elongate material having a starting species attached thereon via a cleavable linker group through at least one reaction zone and reacting said species in said zone, the apparatus comprising a plurality of reaction zones arranged such that an elongate material may be moved through each reaction zone such that the species may be reacted in the reaction zone, each reaction zone being a conduit comprising a fluid source connected to an inlet to the reaction zone such that fluid may be supplied to the reaction zone from the source, the fluid comprising at least one reactant for reaction with said species, and the fluid supplied to the reaction zone flowing through the zone and out of an outlet from the reaction zone, and wherein an inlet and outlet for the elongate material to and from each reaction zone are located above the inlet and outlet to and from the reaction zone wherein the apparatus comprises a plurality of reaction zones that are connected together, and are supplied by a single source of fluid, and wherein said elongate material passes from the outlet of one reaction zone of said plurality of reaction zones into the inlet of an adjacent reaction zone of said plurality of reaction zones.

10. Apparatus of claim 9, which further comprises drive means for effecting the movement of the elongate material through the reaction zone.

11. Apparatus suitable for performing a solid phase reaction method comprising passing an insoluble elongate material having a starting species attached thereon via a cleavable linker group through more than one reaction zone and reacting said species in a said zone, wherein a product of the reacting of the species in a first said zone subsequently undergoes a further reaction in another reaction zone, the apparatus comprising an insoluble elongate material having a starting species attached thereon via a cleavable linker group and more than one reaction zone, arranged such that the insoluble elongate material is moveable through the reaction zones such that the species is reacted in the reaction zones, each reaction zone being a conduit comprising a fluid source connected to an inlet to the reaction zone such that fluid may be supplied to the reaction zone from the source, the fluid comprising at least one reactant for reaction with said species, and the fluid supplied to the reaction zone flowing through the zone and out of an outlet from the reaction zone, wherein an inlet and outlet of the elongate material to and from the reaction zone respectively are located above the inlet and outlet of the fluid to and from the reaction zone respectively, and wherein the apparatus comprises a plurality of reaction zones that are connected together and are supplied by a single source of fluid, and wherein said elongate material passes from the outlet of one reaction zone of said plurality of reaction zones into the inlet of an adjacent reaction zone of said plurality of reaction zones.

* * * * *